United States Patent [19]

Hanks

[11] 4,078,637

[45] Mar. 14, 1978

[54] FLUID DISENGAGED AND SPRING URGED BRAKE

[75] Inventor: James V. Hanks, Minneapolis, Minn.

[73] Assignee: Horton Manufacturing Co. Inc., Minneapolis, Minn.

[21] Appl. No.: 684,560

[22] Filed: May 7, 1976

[51] Int. Cl.² .......................................... F16D 59/02
[52] U.S. Cl. .................................. 188/170; 188/73.2; 188/73.6; 188/264 A; 188/366; 192/91 A
[58] Field of Search .................... 188/71.6, 73.2, 170, 188/218 XL, 264 A, 264 AA, 71.4, 73.6, 264 E, 366; 192/91 A, 113 A

[56] References Cited

U.S. PATENT DOCUMENTS

| | | | |
|---|---|---|---|
| 1,527,798 | 2/1925 | Hawley | 188/71.6 |
| 1,834,242 | 12/1931 | Hollingsworth | 188/73.2 |
| 2,165,978 | 7/1939 | Miller | 188/264 E |
| 2,607,445 | 8/1952 | Rausenberger | 192/113 A |
| 2,698,676 | 1/1955 | Eason | 188/170 |
| 3,000,470 | 9/1961 | Milan | 188/71.6 |
| 3,159,247 | 12/1964 | Charlton | 188/170 |
| 3,468,402 | 9/1969 | Edwards | 192/113 A |
| 3,500,970 | 3/1970 | Schilling | 188/170 |
| 3,667,581 | 6/1972 | Hanks | 192/113 A X |
| 3,695,407 | 10/1972 | Peery | 188/264 E |
| 3,805,935 | 4/1974 | Armstrong | 188/218 XL X |
| 3,897,860 | 8/1975 | Borck et al. | 188/264 E |
| 3,946,838 | 3/1976 | Daniels | 188/170 |
| 3,967,706 | 7/1976 | King | 188/170 |
| 4,011,930 | 3/1977 | Coons et al. | 188/264 E |

Primary Examiner—Trygve M. Blix
Assistant Examiner—Edward R. Kazenske
Attorney, Agent, or Firm—Wicks & Nemer

[57] ABSTRACT

A fluid disengaged and spring urged brake including a hub having a friction ring mounted thereon with a spring housing in which the hub is rotatably mounted. The spring housing has formed therein a multiplicity of cavities in each of which is mounted a coil spring. A friction facing mounting plate with friction facing thereon is secured to torque pins extended freely through holes slidably mounted on a piston secured to the spring housing. The friction facing mounting plate has a hole extending radially therethrough and the friction facing has grooves formed in the face thereof whereby air pressure supplied through from the hole of the mounting plate passes from the same through the grooves of the friction facing to thereby cool the friction interfaces of the engaging surfaces of the friction ring and the friction facing of the mounting plate. Further the friction ring has at least opening therethrough through which bolts securing friction facing in two pieces may be removed without dismantling any portion of the brake.

4 Claims, 6 Drawing Figures

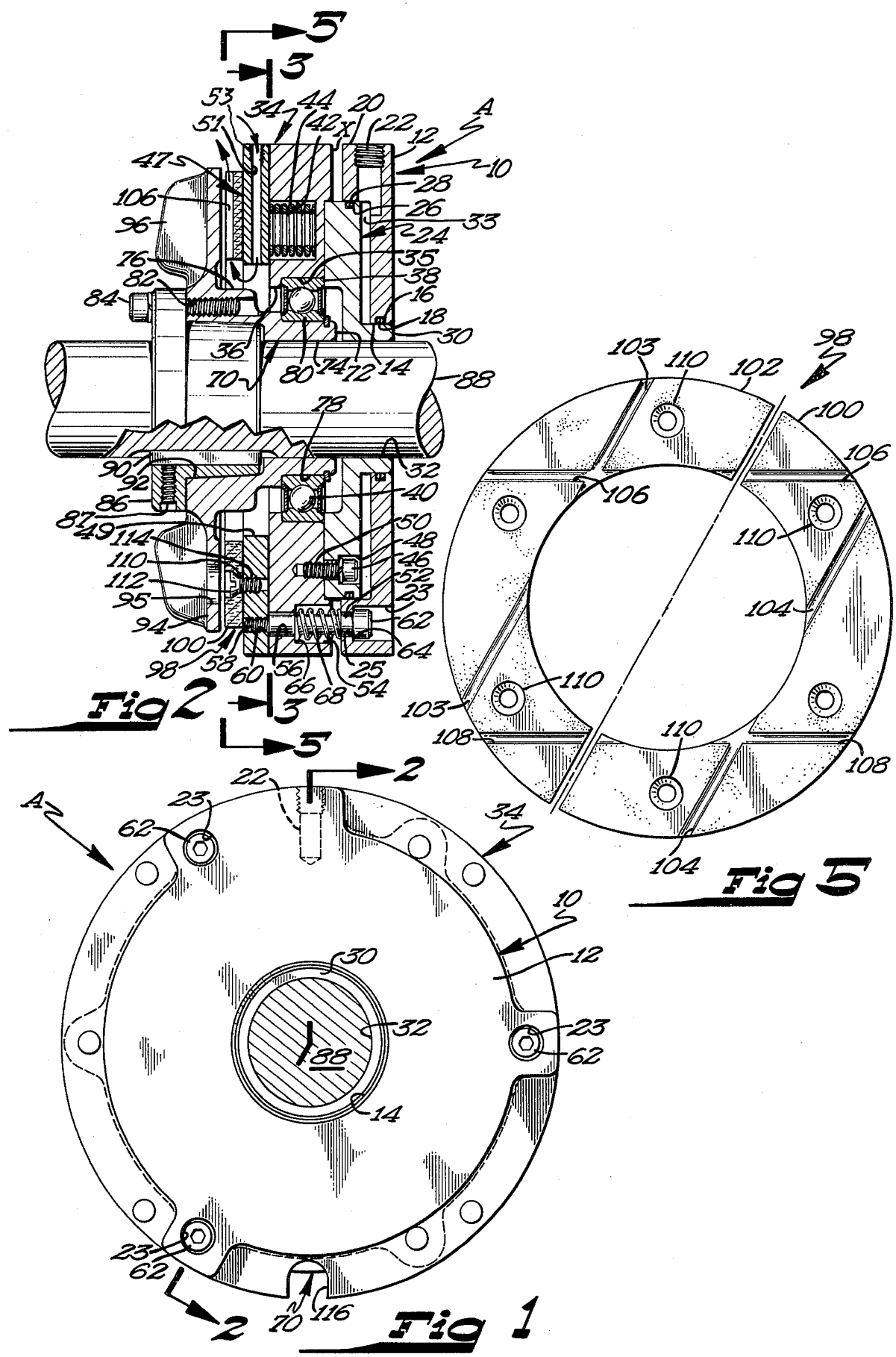

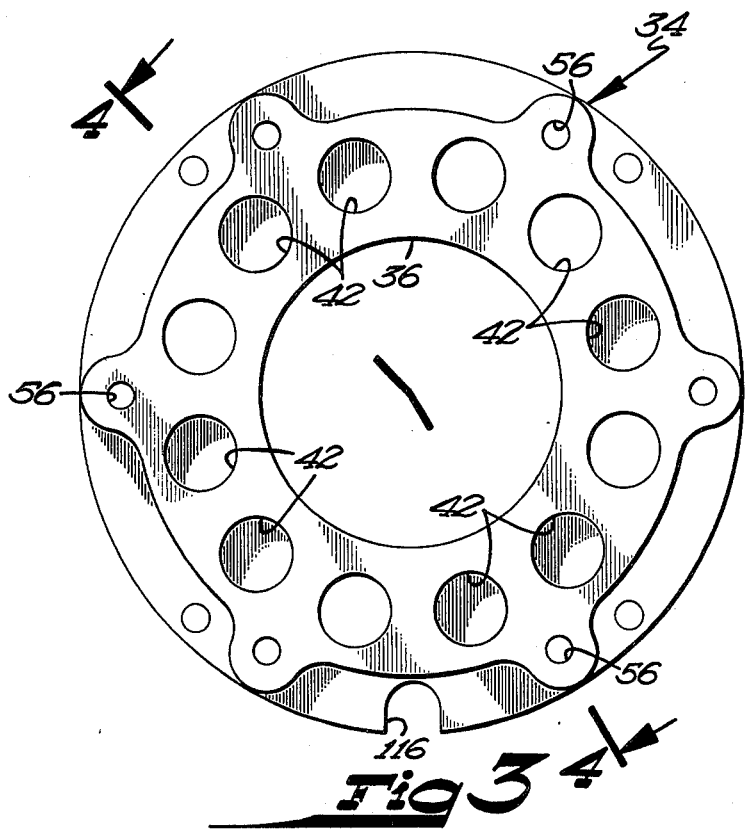
Fig 3
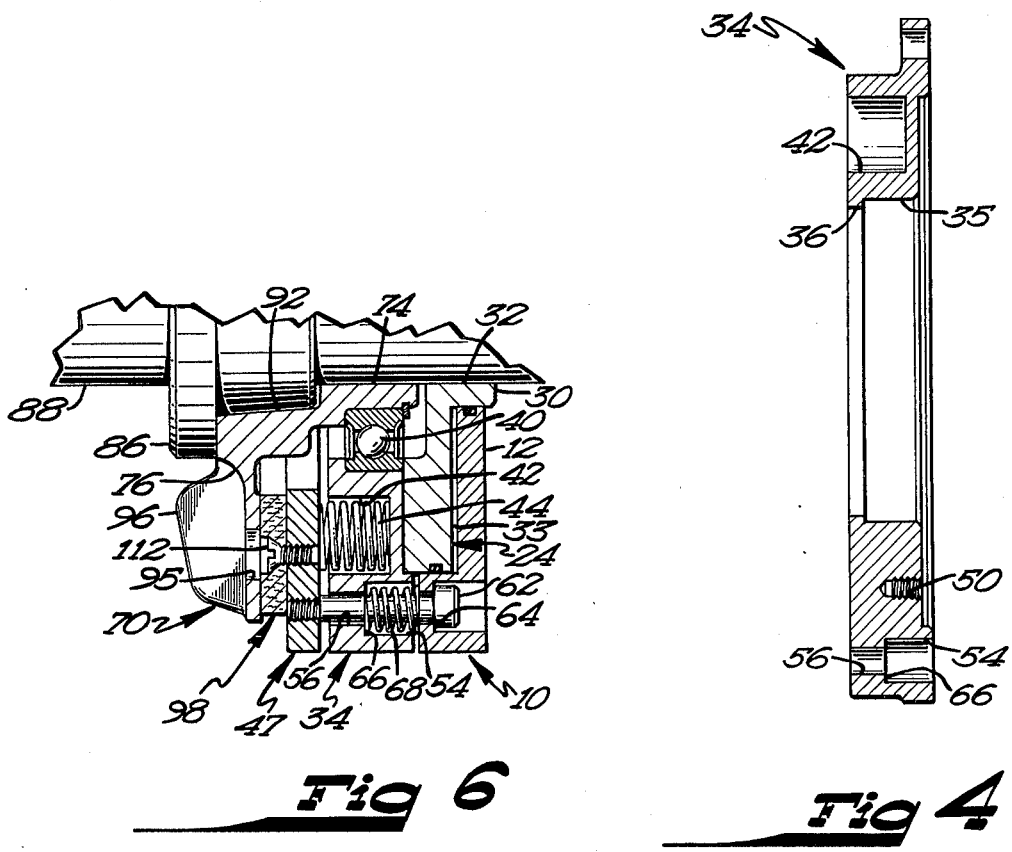
Fig 6
Fig 4

FLUID DISENGAGED AND SPRING URGED BRAKE

SUMMARY

The invention relates to an improvement in a fluid disengaged and spring set brake. It is an object of the invention to provide such a brake having an annular cylinder portion slidably mounted on a piston mounted on an annular spring housing. The spring housing is formed with a multiplicity of spaced cavities in each of which is mounted a coil spring which urge a friction mounting plate into contact with a friction ring secured to a shaft to thereby brake the shaft when there is a loss of fluid pressure in the cylinder.

The cylinder portion is connected to the friction mounting plate by means of spaced torque pins extending freely through holes formed in the spring housing. The cylinder portion by means of the pins pulls against the action of the springs. The multiplicity of springs assures even torque and positive breaking in the event a spring becomes broken. Additionally with the cylinder located exteriorally, i.e. on the outside of the brake, the seals between the cylinder and piston are accessible without dismantling the brake or removal of the shaft to be braked.

It is also a feature to make the friction facing in two pieces to allow removal without dismantling the brake and the bolts securing the friction facing are accessible through at least one hole formed through the friction ring which is aligned with the bolts.

The invention will appear more clearly from the following detailed description when taken in connection with the accompanying drawings, showing by way of example a preferred embodiment of the invention idea wherein like numerals refer to like parts throughout.

In the drawings forming part of this application:

FIG. 1 is an end view of a spring engaged and fluid disengaged brake embodying the invention with the same in disengaged condition.

FIG. 2 is a view on the line 2—2 of FIG. 1.

FIG. 3 is a view on the line 3—3 of FIG. 2 with bearing and springs removed.

FIG. 4 is a sectional view on the line 4—4 of FIG. 3.

FIG. 5 is a sectional view on the line 5—5 of FIG. 2 showing only the friction facing.

FIG. 6 is a partial sectional view similar to the lower portion of FIG. 2 but with the brake shown in set position.

Referring to the drawings in detail, the brake A includes the annular movable cylinder portion 10 which has the flat circular central body portion 12 formed with the axial circular opening 14. The edge of the opening is formed with the recess 16 in which is positioned the O-ring 18. The outer portion of the central body portion 12 terminates in the annular extension 20 in which is formed the fluid inlet 22. The inlet 22 communicates with the interior of the cylinder 10. The body 12 is formed with the spaced recesses 23 each of which terminate in the hole 25.

The numeral 24 designates an annular piston having a diameter such that it slidably fits within the extension 20. The outer edge of the piston 24 is formed with the recess 26 in which is positioned the O-ring 28 for sealing engagement with the inner surface of the annular extension 20. The piston is also formed with the annular flange portion 30 the inner surface of which is coextensive with the axial hole 32 formed in the piston body. The extension 20 and the flange 30 form a cylinder cavity.

Further provided is the annular spring housing 34. The housing 34 is formed with the axial opening 36 in which is formed recess 35 in which is close fit the outer race 38 of the bearing 40. The numeral 42 designates a multiplicity of spaced cavities which are radially outward of the opening 36 and in each is positioned a brake actuating coil spring 44. The piston 24 is secured to the housing 34 by means of the multiplicity of bolts 46 positioned in the holes 48 and threadedly engaged in the threaded holes 50 of the housing 34.

Also provided is the annular friction facing mount 47 formed with the axial opening 49, and the mount 47 includes the radially disposed air inlet hole 51 threaded at its outer end as at 53 for connection with a pressurized air supply not shown. The mount 47 is not axially fixed to the housing 34 but free to move to and from the housing as hereinafter explained.

The annular movable cylinder portion 10 is mounted on the housing 34 by means of torque pins 52 with the heads thereof in the recesses 23 and the shank thereof extended through the holes 25 and spaced recesses 54 of the housing 34. The pins also extend freely through the spaced holes 56 leading from the recesses 54.

The threaded ends 58 of the pins 52 are mounted by engaging the ends in a threaded hole 60 of the friction facing mount 46. The mount 47 is thus slidably mounted on the spring housing 34.

The head 62 of the pins 52 contacts the shoulder 64 formed at the juncture of the recess 23 and the hole 25. A shoulder 66 is also formed at the juncture of the recess 54 and the hole 56. Positioned upon each of the pins 52 and within a recess 54 is a return coil spring 68 which abuts the shoulder 66 and the inner face of the annular extension 20 of the cylinder 10, thereby urging and maintaining the cylinder 10 outwardly during disengagement.

The numeral 70 designates a hub formed of the annular flange portion 72 with the axial hole 74 and the annular base portion 76. The flange portion 72 is formed with the annular recess 78 in which is press fit the inner race 80 of the bearing 40 thereby allowing the hub 70 to rotate within the housing 34. The base portion 76 of the hub 70 is formed with a multiplicity of threaded holes 82 in which are engaged the threaded bolts 84 and which secure the conventional mount 86 for the shaft 88. The shaft 88 is secured in the mount 86 by means of the key 90 secured by screw 87. The shaft mount 86 is taper fit in the tapered hole 92 of the hub 70. The shaft 88 to be braked extends freely through the holes 74 and 32.

Extending radially outwardly from the annular base portion 76 of the hub is the friction ring 94, and formed on the outer surface of the ring 94 are spaced cooling fins 96. Further provided is the two piece friction facing 98 composed of the two identical substantially semicircular half portions 100 and 102. The outer face surface of each of the ring half portions 100 and 102 have formed therein the spaced grooves 103, 104, 106, and 108 which extend from the inner edge of the half portion to the outer edge.

The friction facing half portions 100 and 102 each have formed therethrough the spaced countersunk holes 110. The friction portions are secured to the mount 47 by means of the slotted cap screws 112 in the holes 110 and threaded holes 114 of the mount.

The spring housing 34 has formed in the outer edge thereof the recess 116 in which is engaged a conventional anchor member, not shown, whereby the housing 34, piston 24 and cylinder 10 do not rotate.

The shaft 88 is allowed to rotate by introducing fluid pressure through inlet 22 to the cylinder 10 whereby the cylinder 10 moves to the right of FIG. 1 and as it does the torque pins 52 draw the mounting plate 46 and friction facing 98 thereon against the stationary spring housing 34 with the friction facing portions 100 and 102 moved out of contact with and free of the friction disc 94. As pointed out the pins 52 move freely through the holes 56.

In FIG. 1 there is disengagement at the interface of friction ring 94 and friction facings 100 and 102 due to fluid pressure in cylinder cavity 33. In the event of supply pressure failure in the cylinder cavity 33, the cylinder portion 10 is free to move inwrdly and the springs 44 move the mounting plate and friction facing thereon in pressure contact with the friction disc 94 thereby braking the shaft 88.

The springs 68 are in effect return springs and not actuation springs and keep the cylinder portion 10 up snug under the heads of the torque pins 52 and prevent engagement "pound" of cylinder portion and pin head which reduces impact at engagement. The pins 52 obsorb torque when the brake is spring engaged.

The friction ring 94 includes an opening 95 radially located so that the same may be rotatably positioned opposite the bolts 112 whereby the bolts may be removed through the opening without dismantling the brake. With the bolts removed the friction facings 100 and 102 may be removed for replacement due to the fact that the facings are in two separable pieces, again without dismantling the brake.

It will be noted that with the cylinder portion 10 pulling as it were through the spring housing by means of the torque pins, that access to the friction facing mounting cap screws 112 is direct through a single outside member 96.

Having thus described the invention, what is claimed as new and desired to be secured by Letters Patent is:

1. A fluid disengaged and spring urged brake comprising:
   a. a hub,
   b. a friction ring carried by said hub,
   c. a spring housing,
   d. means rotatably mounting said hub within said spring housing,
   e. means mounting a multiplicity of springs on said spring housing,
   f. a friction facing mounting plate,
   g. a friction facing,
   h. means securing said friction facing to said friction facing mounting plate,
   i. a piston carried by said spring housing,
   j. a cylinder member mounted on said piston forming a cylinder cavity,
   k. means connecting said cylinder with said friction facing mounting plate free of said spring housing, whereby loss of fluid pressure in said cylinder cavity allows said cylinder to move toward said friction ring causing said springs of said spring housing to urge said friction facing on said friction facing mounting plate into contact with said friction ring thereby braking a shaft connected to and rotatable with said hub,
   l. said spring housing being annular,
   m. said means rotatably mounting said hub within said spring housing including a bearing interposed between said spring housing and said hub,
   n. said means mounting said multiplicity of springs on said spring housing including a cavity formed in said spring housing for each of said springs,
   o. said friction facing being in at least two pieces and,
   p. said friction ring being formed with an access hole through which said friction facing securing means is accessible for removal of said pieces of friction facing without dismantling any portion of the brake.

2. A fluid disengaged and spring urged brake comprising:
   a. a hub,
   b. a friction ring carried by said hub,
   c. a spring housing,
   d. means rotatably mounting said hub within said spring housing,
   e. means mounting a multiplicity of springs on said spring housing,
   f. a friction facing mounting plate,
   g. a friction facing,
   h. means securing said friction facing to said friction facing mounting plate,
   i. a piston carried by said spring housing,
   j. a cylinder member mounted on said piston forming a cylinder cavity,
   k. means connecting said cylinder with said friction facing mounting plate free of said spring housing, whereby loss of fluid pressure in said cylinder cavity allows said cylinder to move toward said friction ring causing said springs of said spring housing to urge said friction facing on said friction facing mounting plate into contact with said friction ring thereby braking a shaft connected to and rotatable with said hub,
   l. said friction facing means being in at least two pieces, and
   m. said friction ring being formed with an access hole through which said friction facing securing means is accessible for removal of said pieces of friction facing without dismantling any portion of the brake.

3. A fluid disengaged and spring urged brake comprising:
   a. a hub,
   b. an annular friction ring carried by said hub,
   c. an annular spring housing,
   d. a bearing mounted between said annular spring housing and said hub in radial alignment and rotatably mounting said hub radially within said spring housing,
   e. said annular spring housing having a cavity for each of
   f. a multiplicity of springs for contact with
   g. an annular friction facing mounting plate,
   h. an annular friction facing connected to said mounting plate,
   i. an annular piston carried by said annular spring housing,
   j. an annular cylinder member mounted on said piston forming an annular cavity therebetween,
   k. means connecting said annular cylinder with said annular friction facing mounting plate free of said annular spring housing, said means including said annular cylinder member having a multiplicity of holes through each of which freely extends a pin secured on said friction facing mounting plate whereby loss of fluid pressure in said cylinder cavity allows said cylinder to freely move toward said friction ring causing said springs of said spring housing to urge said friction facing on said friction facing mounting plate into contact with said friction ring thereby braking a shaft connected to and rotatable with said hub, l. said friction facing including at least two pieces, and m. said friction ring is formed with an access hole through which said friction facing securing means is accessible for removal of said pieces of friction facing without dismantling any portion of the brake.

4. A fluid disgaged and spring urged brake comprising:

a. hub, b. an annular friction ring carried by said hub, c. an annular spring housing, d. a bearing mounted between said annular spring housing and said hub in radial alignment and rotatably mounting said hub radially within said spring housing, e. said annular spring housing having a cavity for each of f. a multiplicity of springs for contact with g. an annular friction facing mounting plate, h. an annular friction facing connected to said mounting plate, i. an annular piston carried by said annular spring housing, j. an annular cylinder member mounted on said piston forming an annular cavity therebetween, k. means connecting said annular cylinder with said annular friction facing mounting plate free of said annular spring housing, said means including said annular cylinder member having a multiplicity of holes through each of which freely extends a pin secured on said friction facing mounting plate whereby loss of fluid pressure in said cylinder cavity allows said cylinder to freely move toward said friction ring causing said springs of said spring housing to urge said friction facing on said friction facing mounting plate into contact with said friction ring thereby braking a shaft connected to and rotatable with said hub, l. said friction facing mounting plate including an air inlet hole extending there through for connection with a supply of air pressure and communication with m. grooves formed on said friction facing whereby air flows through said air inlet hole and out through said grooves to cool the friction surfaces.

* * * * *